United States Patent [19]

Stieler

[11] Patent Number: 5,331,578

[45] Date of Patent: Jul. 19, 1994

[54] PROCEDURE FOR MEASURING ANGLES AND TRAJECTORIES BY MEANS OF GYROS AND INERTIAL SYSTEMS

[75] Inventor: Bernhard F. M. Stieler, Braunschweig, Fed. Rep. of Germany

[73] Assignee: Deutsche Forschungsanstalt fur Luft- und Raumfahrt e.V., Cologne, Fed. Rep. of Germany

[21] Appl. No.: 757,842

[22] Filed: Sep. 11, 1991

[30] Foreign Application Priority Data

Sep. 14, 1990 [DE] Fed. Rep. of Germany ....... 4029215

[51] Int. Cl.$^5$ .............................................. G01C 1/00
[52] U.S. Cl. .......................... 364/571.01; 364/571.02; 364/551.01; 364/449; 364/571.05; 33/1 N; 33/313; 33/318; 33/321; 73/1 E; 73/865.8; 73/866.5
[58] Field of Search ...................... 364/571.01, 571.02, 364/571.04, 571.05, 571.07, 551.01, 559, 453, 454, 443, 449; 33/1 N, 312, 313, 318–324; 73/1 E, 865.8, 866.5

[56] References Cited

U.S. PATENT DOCUMENTS

| | | | |
|---|---|---|---|
| 4,168,524 | 9/1979 | Soltz et al. | 364/571.02 |
| 4,756,088 | 7/1988 | Russell et al. | 33/312 |
| 4,799,391 | 1/1989 | Lara | 73/865.8 |
| 4,945,775 | 8/1990 | Adams et al. | 73/865.8 |
| 4,954,837 | 9/1990 | Baird et al. | 364/449 |
| 5,060,175 | 10/1991 | Cubalchini et al. | 33/318 |
| 5,075,693 | 12/1991 | McMillan et al. | 364/454 |

OTHER PUBLICATIONS

B. Stieler, H. Winter "Gyroscopic Instruments and Their Application to Flight Testing" Agard-AG-160 vol. 15 (1982).

Primary Examiner—Jack B. Harvey
Assistant Examiner—Hal D. Wachsman
Attorney, Agent, or Firm—Salter, Michaelson & Benson

[57] ABSTRACT

The calibration of time-depending measurement uncertainties of gyros and inertial systems by the differences of angular and/or velocity and/or positional measurements which are carried out and repetitiously executed with a view to undetermined reference directions and-/or fixed locations varying with time. The differentiation allows to forego precise reference data. Measurement uncertainties can be corrected through calibration subsequently to the measurement process. For the measurement of spatial angles a three-axis gyro measurement package comprising a computer and the possibility of feeding or automaticly reading-in of reference data characterizing the reference directions. The reference data can be a number, a marker of the measurement point or in the case of positional measurements a terrestrial aiming point. When measuring angular characteristics, i.e. the interdependence of angles and external forces or moments, the latter are considered as references. For the measurement of contours the distance has to be fed in or read in, or computed by accelerometers within an integrated inertial system, respectively. By such a system and through the application of the invention the measurement accuracy of movements and gravity anomalies can be increased while refraining from external references otherwise necessary under the present state of the art.

9 Claims, 8 Drawing Sheets

PROCEDURE FOR MEASURING ANGLES AND TRAJECTORIES BY MEANS OF GYROS AND INERTIAL SYSTEMS

BACKGROUND OF THE INVENTION

Measuring spatial angles, trajectories, contours and movements as well as gravity anomalies signifies a difficult problem in the technical field, as can be seen from the following examples.

In structural engineering inclinations as a function of curved radii have to be measured for the construction of roads or railroads; similar problems exist in civil engineering in connection with the measurement and construction of tunnels, wells and pipes. For boring into the interior of the earth the course of the drill stems has to be defined and controlled. Elastic deformation characteristics, i.e. angular and positional changes as a function of exterior strain have to be considered in automotive engineering and aircraft construction. In wind tunnel techniques aerodynamic forces and moments have to be included as regards their dependence upon the angle of attack. In tests with aircraft and vehicles movements have to be traced with regard to position, velocity, attitude and heading as a function of time. In geodesy a tract of land is determined by measurements and plotted into maps starting from an astronomicly determined point of reference. Finally in connection with these measurements gravity anomalies are often of interest, as the direction of gravity and its anomalies affect astronomical measurements. Gravity anomalies can supply information on possible mineral resources.

Nowadays gyros and complete inertial systems (INS) are already being used for the resolution of the above mentioned problems. Because of the integration with time of the gyro and accelerometer signals (a*) for the computation of the angle or position, system deviations build up which increase with time and are due to the sensor's measurement deviations. In order to keep these deviations small, either high- capacity and therefore expensive systems are being used and/or calibration or aiding procedures.

Calibration procedures are implemented either before or after the measuring procedure itself, as known external references are then available. When using gyros or complete inertial systems, the calibration procedures are insofar disadvantageous, as they require a large amount of time. The computation of the parameters of an error model is implemented through integration with time, and the calibration accuracy increases with increasing time. Calibration procedures of that kind are, for example, known for the gyros of a three-axis stabilized satellite [German Specification DE 37 34941 C2] or for the initiation and/or recalibration of a subsidiary inertial navigation system [German Specification DE 3445463 A1]. A further disadvantage of the calibration procedure lies in the fact that the accuracy of the subsequent measurement series will be limited, if sensors are being used whose error parameters are a function of time. The calibration mentioned above procedures rely on a certain stability of those values in the course of the measurement procedure. This disadvantage can be seen in the case of the measurement procedures with gyros which are used for deep boring in the inner of the earth. In this case the temperature and thus drifting conditions change drastically and extremely for the gyros during the measuring process, and the calibration data obtained in the beginning or towards the end of the procedure are not representative for the whole measurement series.

At the present state of technical development the application of so-called aiding procedures comprises the use of known external reference data during the measuring process together with special mathematical algorithms (e.g. Kalman filter) [Gyroscopic Instruments and their Application to Flight Testing, AGARDograph No. 160, Vol. 15, September 1982, Chapter 8]. Compared with the calibration procedures mentioned above they can successfully be applied even if sensors of inferior quality, i.e. with instable error parameters are used. A disadvantage of this procedure is, of course, the provision of such external measurement data, which generally requires the availability of measuring instruments, or which is beyond any possibilities. While in the case of flight tests signals from radio navigation aids are available for positional aiding of inertial systems, those reference data are frequently not at hand for the positional measurement of drill stems. For geodetic measurements based on inertial systems (inertial geodesy) the aiding is based on accurately defined reference points and, in addition, on "zero velocity updating (ZUPT)", which means that the measurement vehicle is stopped and the velocity zero is fed into the computer as aiding information. It is true that the latter is an aiding method which can easily be implemented, but it requires an increased amount of time for the measurement process as a whole, and it is limited in its accuracy for the subsequent definition of the reference points, as the aiding does not comprise any external reference point measurements. Aiding information for the definition of gravity anomalies in a test area by means of an INS requires comprehensive and time consuming measurements at clearly defined reference points preliminary to the measurement series itself by means of gravimeters, and is therefore only rarely available. The invention constitutes however a valuable supplement to all the described aiding procedures.

In the U.S. Pat. No. 4,799,391 a procedure for the measurement of the curvature of pipelines is described using so-called pigs, which are taken along the pipeline by the medium transported as separating elements between the individual charges. Like an aircraft these pigs are equipped with an INS with three gyros, three accelerometers and a digital computer. For the definition of positions by means of an INS external measurements for the INS aiding are employed such as indicators along the pipeline, for instande magnetic anomalies in form of girth welds or similar markers. The measurments are taken at a high sampling frequency during the one time travel of the pig along the pipeline.

Further reference is made to commonly owned U.S. patent application Ser. No. 07/699,481.

SUMMARY OF THE INVENTION

The present invention provides a measuring and evaluation procedure for the definition of spatial angles, trajectories, contours and movements as well as gravity anomalies using an apparatus including three gyros or an inertial system.

In accordance with one aspect of the present invention a procedure for measuring spatial angles by means of an apparatus including three gyros is provided said apparatus is moved in a chronicle order at least twice to different locations at which each time measurements are made for identical reference directions at said locations at time intervals $t_{j1}$ and $t_{j2}$ for identical reference directions (j=direction of the repeated measurement, 1, 2=points of time), said measurements are fed into a computer for data processing, said computer is provided with a time basis for said measurements and means for optimal estimation of system errors, using as basis models for the relationship between the measurements and system errors and means for carrying out a correction of the measurements on the basis of said estimation, in the data processing the differences $y_j$ of the gyro measurements are computed for the repeated measurements with respect to identical reference directions j, at each location, the models for the development with time of the system error differences including the sensor errors for the point of time 0 of the beginning of the measurement are computed forward in time, and for the point T of the end of the measurement are computed backward in time and through their setting equal with the measurement differences $y_j$ as measurement equations reading:

$$y_{j,v} = H \cdot (\Phi(t_{j2}, 0) - \Phi(t_{j1}, 0)) \cdot x_0 + v_j$$

$$y_{j,r} = H \cdot (\Phi(t_{j2}, T) - \Phi(t_{j1}, T)) \cdot x_T + v_j$$

with the indices v and r meaning forward and backward in time, respectively, and H = (I 0 0) = measurement matrix, $\Phi(t, 0)$ = transition matrix of point of time 0 to t, $x = (\epsilon^T d^T r^T)^T$ = system error vector, with $\epsilon$ = angle error vector, d = gyro drift vector, r = vector of time-dependent gyro drift variation, and v = measurement noise vector
are taken for optimally estimating the system errors, on the said basis two time functions of the optimally estimated system errors $\hat{x}_v$ and $\hat{x}_r$ are computed, based on the beginning and the end of the measurements as a foundation for the joint time function $\hat{x}$ obtained through the formation of weighed mean value computation, a correction of the measurements is carried out by means of the said system error time function.

An object is that for characterizing identical reference directions, reference values are chosen which are in a definite physical relationship with the reference directions.

Another object is that for the observability of the time-dependent changes r of the sensor errors the arithmetic means of the times which fulfilled the requirements for identical measurement conditions, change significantly.

A further object is that for the measurement of trajectories the gyros have to be moved at least two times to fixed locations of the trajectory and that the angular measurements with respect to the reference directions of the trajectory have to be repeated at the fixed locations.

Still another object is that for the definition of the fixed locations track measurement sensors are employed.

A further superior aspect of the invention is a procedure for the measurement of trajectories an inertial navigation system (INS) including in addition to said three gyros, three accelerometers and a computer for position computation is used, the system error vector of which reads:

$$x = (\epsilon^T \delta V_n^T \delta S_n^T d^T r^T b^T)^T$$

with
$\delta V_n$ = vector of the velocity error,
$\delta S_n$ = vector of the position error, and
b = vector of the acceleration measurement error, with regard to the fixed locations of the trajectory positional measurements are carried out at least two times and at time intervals, in the subsequent data processing in the computer, the differences $y_j$ of the INS position measurements are computed for the repeated measurements with respect to identical fixed locations j, the models for the development with time of the system error differences inclusive of the sensor errors for the point of time 0 of the beginning of the measurement are computed forward in time, and for the point T of the end of the measurement are computed backward in time and through their setting equal with the measurement differences $y_j$ as measurement equations reading:

$$y_{j,v} = H \cdot (\Phi(t_{j2}, 0) - \Phi(t_{j1}, 0)) \cdot x_0 + v_j$$

$$y_{j,r} = H \cdot (\Phi(t_{j2}, T) - \Phi(t_{j1}, T)) \cdot x_T + v_j,$$

with the indices v and r meaning forward and backward in time, respectively, and H = (0 0 I 0 0 0) = measurement matrix, are taken for optimally estimating the system errors, on the said basis two time functions of the optimally estimated system errors $\hat{x}_v(t)$ and $\hat{x}_r(t)$ are computed, based on the beginning and the end of the measurements as a foundation for the joint time function x obtained through the formation of mean values, a correction of the measurements is carried out by means of the said system error time function.

An object in connection with this further superior aspect lies therein that at the fixed locations the position measurements are supplemented by velocity measurements, and that for data evaluation the following measurement matrix serves as basis:

H = (0I I 0 0 0).

A further object is that at the fixed locations the position measurements are supplemented by angular measurements with respect to identical reference directions, and that for data evaluation the following measurement matrix is taken as basis:

H = (I 0 I 0 0 0).

Still further aspects and objects of the present invention will be further appreciated by those skilled in the art upon reading the detailed description which follows in conjunction with the drawing.

BRIEF DESCRIPTION OF THE DRAWINGS

In order that the invention may be understood, the procedure according to the invention will now be described by way of examples with reference to the accompanying drawings, in which.

DETAILED DESCRIPTION OF THE INVENTION

EXAMPLE NO. 1

Figure 1:
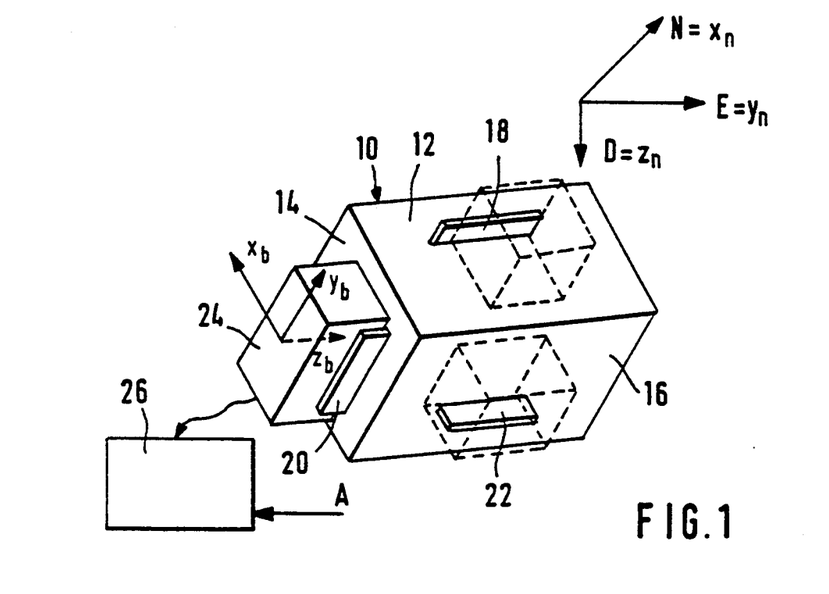
FIG. 1 shows the procedure in application for the measurement of angles between reference surfaces.
Figure 2:
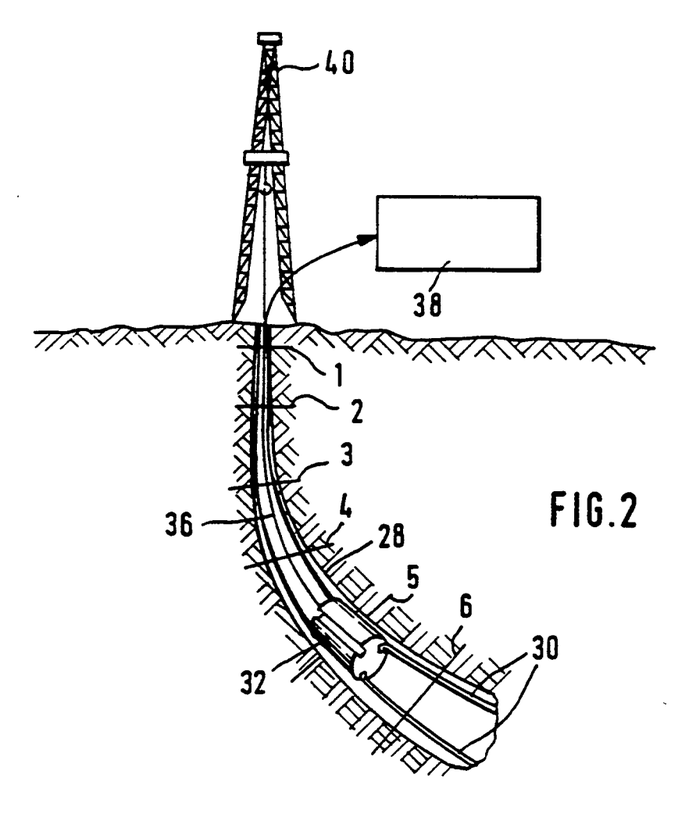
FIG. 2 shows the procedure in application for the measurement of angles along a path in space with a guide rail for the gyro measurement unit.
Figure 3:
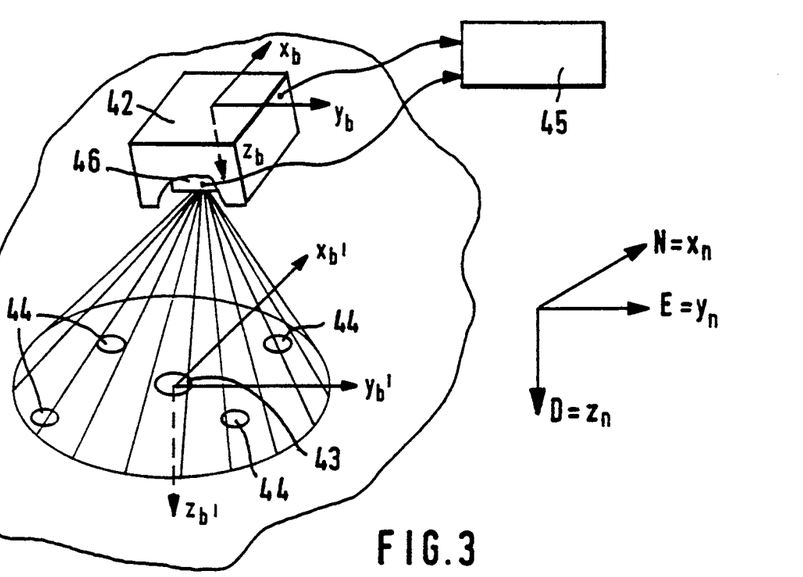
FIG. 3 shows the procedure in application of a contact-free measurement of spatial angles.
Figure 4:
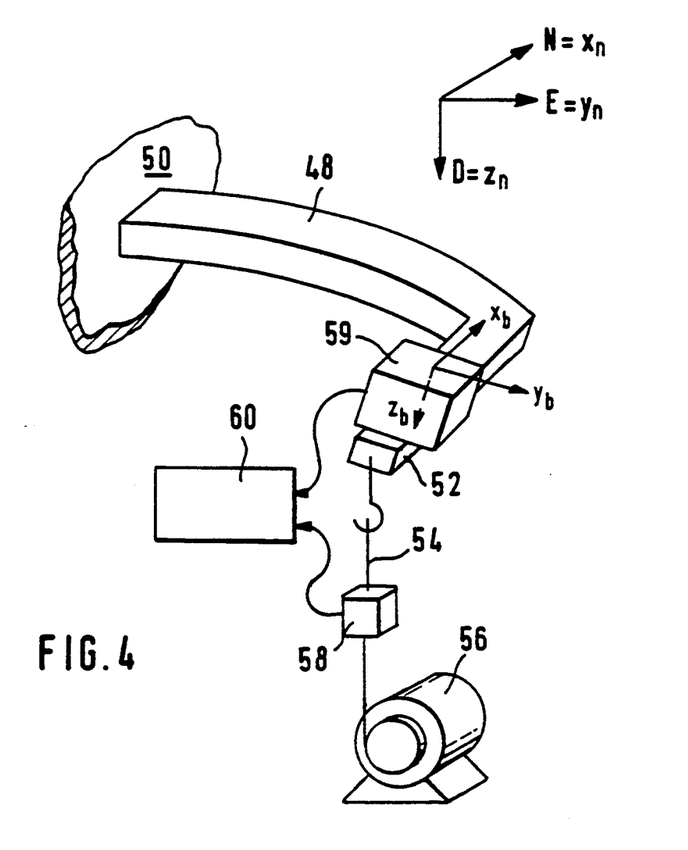
FIG. 4 shows the procedure in application for the measurement of spatial angular characteristics, i.e. the spatial deformation of construction parts as a result of external loads.

For the measurement of angles between reference directions in space as well as for spatial angular characteristics (dependence of spatial angular deformation of strained construction parts on the external forces or moments, or for aerodynamical measurements, on the spatial angle of attack) a three-axis gyro measurement system with reference surfaces or guide rails and the registration of reference data in the computer are only required. The latter can, for example, be manually fed-in reference data for the measurement positions or their automaticly read-in marking points (FIGS. 1 and 2). For contact-free angular measurement, the measurement of control points with the aid of an optical instrument for angular measurement stationarily fixed to a gyro measurement package (autocollimatior, measuring camera) can be carried out, and, correspondingly, the evaluation of the measurement of the relative angle between gyro measurement package unit and surface (FIG. 3). As against the present technical know-how, this allows to do without the otherwise necessary stationary basis. For measuring deformation or aerodynamic characteristics, the external forces or moments are taken as reference data (FIG. 4). Measurements in one reference plane are described in U.S. Ser. No. 07/699,481, to which reference is made. The invention deals with spatial measurements, inclusive of contact-free measurements.

The mentioned illustrating examples are described in more detail in accordance with FIGS. 1 to 4.

FIG. 1 is a schematic drawing of a body 10 of any chosen form having three measurement points 1, 2 and 3 with measurement surfaces 12, 14 and 16, each of which being provided with stops 18, 20 and 22, respectively. For the measurements a measuring instrument 24 with three gyros with the axes $x_b$, $y_b$ and $z_b$ is needed. The spatial angle of the respective measurement point of the body 10 is the angle of the coordinates $x_b$, $y_b$ and $z_b$ relative to the geostationary coordinates $N=x_n$, $E=y_n$ and $D=z_n$. For the measurement the gyro measurement package is positioned at least two times in sequence on each of the three measurement surfaces in contact with the respective stops. The drawing shows the measuring instrument in contact with measurement surface 14. On the remaining other measurement surfaces mentioned its position is shown in dotted lines in the drawing. The respective gyro measurement values are, like in the other illustrations, fed into a computer 26 together with a time basis. In addition, a reference value A is fed into the computer for the respective measurement. In the case of the example according to FIG. 1 this reference value is, for instance, the marking of the measurement points 1 to 3.

The example of FIG. 2 is a setup for the measurement of the course of a bore hole 29. In the bore hole 29 is a guide rail 30 with, for instance, three guiding tracks, two of which are shown in the drawing. The measuring instrument itself 32 contains again three gyros set up in the three spatial coordinates. The guide rail 30 can be provided with markings 1 to 6, etc. These markings can be opticly traceable, the measurement instrument then has to be provided with an optical system for reading the individual marked measurement positions. The measurement instrument 34 is connected to the computer 38 by means of a cable 36. In this illustration of an example the respective measurement positions constitute the reference values. Apart from the gyro measurement data the reference values are thus equally fed into the computer via cable 36. The position of the measurement instrument 32 can also be defined by a tape measure or the like, which can, for example, be spooled up and down from the derrick mounted above 40, and from which the respective reference value can then be fed into the computer.

The illustrating example represented in FIG. 3 shows the measuring instrument 42 stationarily fixed to an optical angular measurement instrument 46 such as an autocollimator or a measurement camera. Here the position of the measurement instrument relative to point 43 with the spatial coordinates $x_b'$, $y_b'$ and $z_b'$ is measured. For this purpose the position of the measurement instrument with its spatial coordinates $x_b$, $y_b$ and $z_b$ is determined by means of the gyro measurement package in the measurement instrument 42. For the definition of the position control points 44 in the range of point 43 have to be set up which can be traced by the optical measurement instrument. Via the optical registration of the control points the taken picture is fed into the computer and processed, and the angular position of the measurement instrument with respect to point 43 is determined in the computer in accordance with optical laws. Furthermore, the identification of the respective measurement points is fed into the computer 45.

FIG. 4 shows a right-angled beam 48 clamped on one end and bent on the other end 52, on which at the distance of the beam's axis a force acts, for instance, via a rope 54, the force being generated by a motor 56. The rope is equipped with a force transducer 58. The respective force is here the reference value fed into the computer 60. On the angled end 52 of the beam 48 a measurement instrument 59 is installed comprising three gyros, by means of which its position relative to space is defined by the spatial coordinates $x_b$, $y_b$ and $z_b$. Here again the gyro signals are fed into the computer.

EXAMPLE NO. 2

For the measurement of spatial trajectories and contours a three-axis gyro measurement package with angular guide rail and an instrument for the measurement of the track is required. The latter can consist of an instrument for the automatic reading-in of the preliminarily marked track for the measurement procedure, such as shown in FIGS. 5 and 6.

Figure 5:
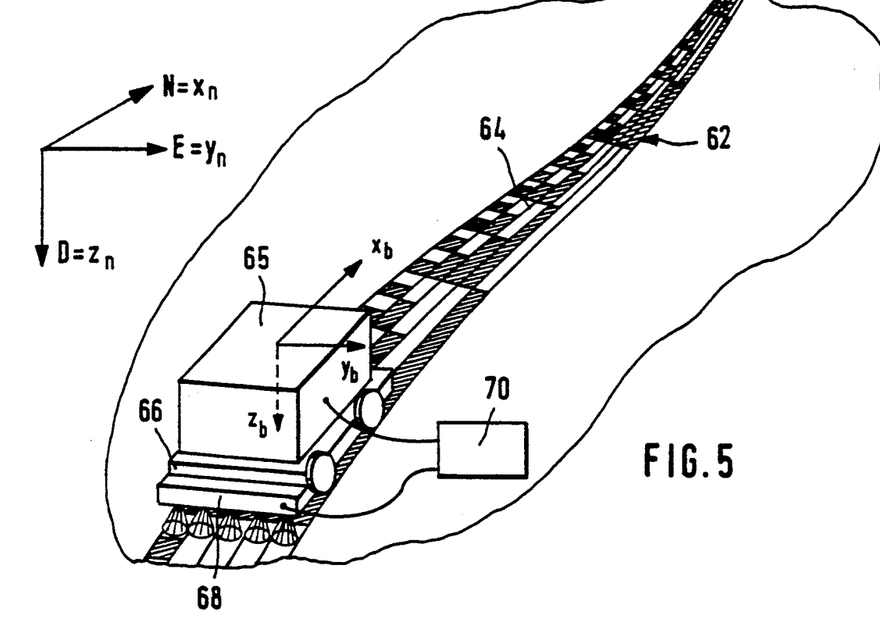
FIG. 5 shows the procedure in application for the measurement of spatial contours on a digitally marked path.

In the example according to FIG. 5 a digitally coded track 64 is installed above a contour 62 to be measured, over which the measurement instrument with the three gyros is moved through a movable carrier 66 which is sketched here as a measurement vehicle. The movable carrier 66 is equipped with an optical scanner 68. The track data measured by it are fed into the computer 70 as reference values.

Figure 6:
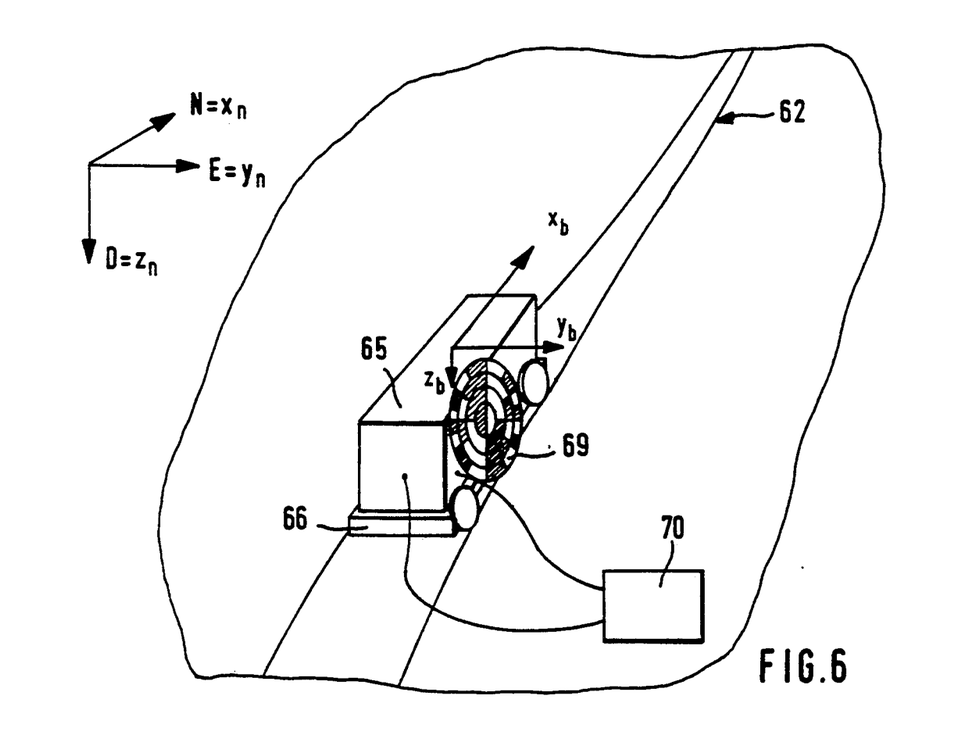
FIG. 6 shows the procedure in application for the measurement of spatial contours in connection with the measurement of a path by means of an odometer.

In the example according to FIG. 6 a contour 62 is to be measured. Again the measurement instrument 65 is installed on a carrier 66 that can be moved in the longitudinal direction of the contour 62. It is conceived to use as odometer a measuring wheel 68 rolling along the contour to be measured with an optical scanner (not represented) which is shown here with digital coding. Also in this case the track is fed into the computer as reference value.

Figure 7:
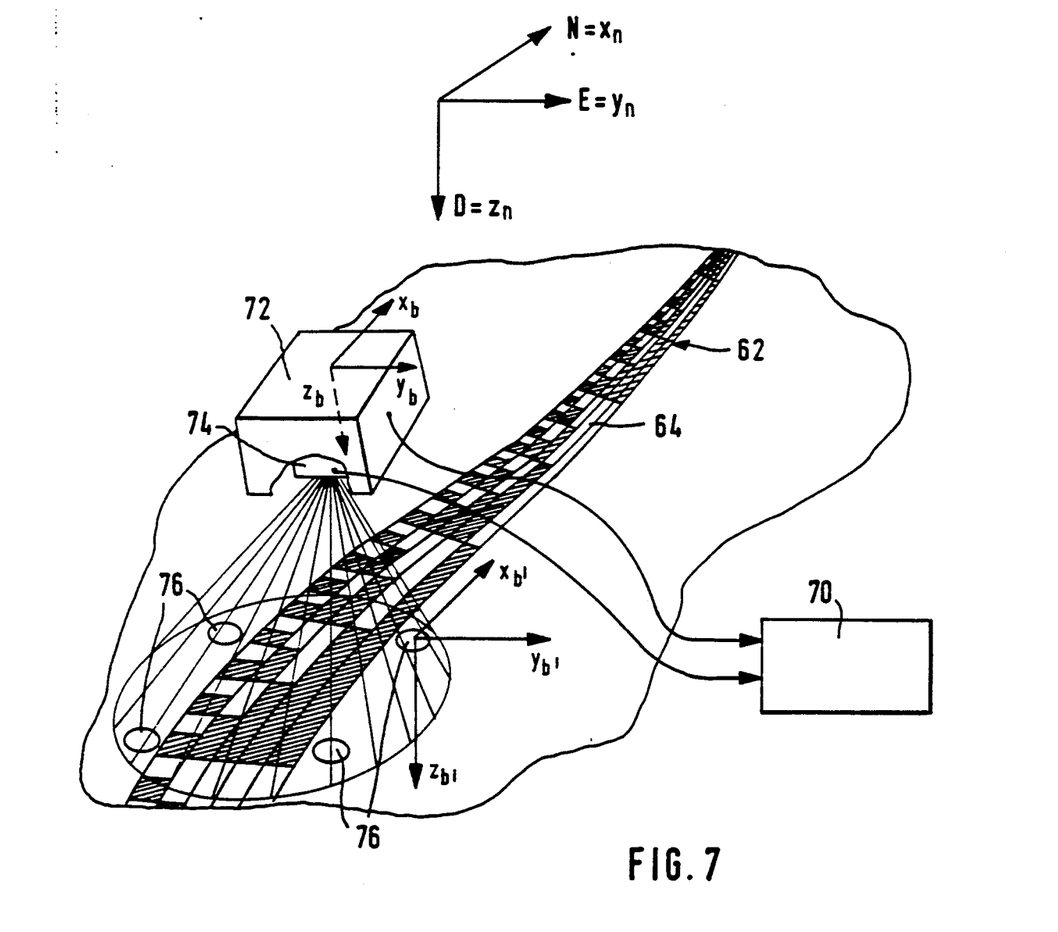
FIG. 7 shows the procedure in application for contact-free measurement of spatial contours.

In the example according to FIG. 7 the measurement instrument 72, which is equipped with an angular position measurement instrument 74 as, for instance, in the example of FIG. 3, is moved contact-free over the contour to be measured 62. With the aid of reference points 76 the angular position of the spatial coordinates of the measurement instrument 72 relative to the coordinates $x_b'$, $y_b'$ and $z_b'$ of the respective measurement point is determined. Furthermore, by means of the digital track marking 64 the respective position of the measurement instrument in the longitudinal direction of the contour is registered by the measuring camera.

EXAMPLE NO. 3

Instead of a directly tracing odometer the path can be computed by means of a three-axis accelerometer package on the basis of the acceleration of the dynamic measurement process. The measurement system is then a complete inertial navigation system (INS) with reference surfaces, i.e. it consists of three gyros, three accelerometers with a computer. For the application of the invented procedure it is a prerequisite that for the processing of the measurement signals also reference values, such as position markings, are registered in the computer, as described with reference to FIG. 3. Thus in the example of FIG. 6 the mechanically driven odometer 69 or in that of FIG. 7 the path markings directly installed along the contour can be renounced. By refraining from the otherwise necessary geostationary basis an immense flexibility of the measurement can be attained.

Figure 8:
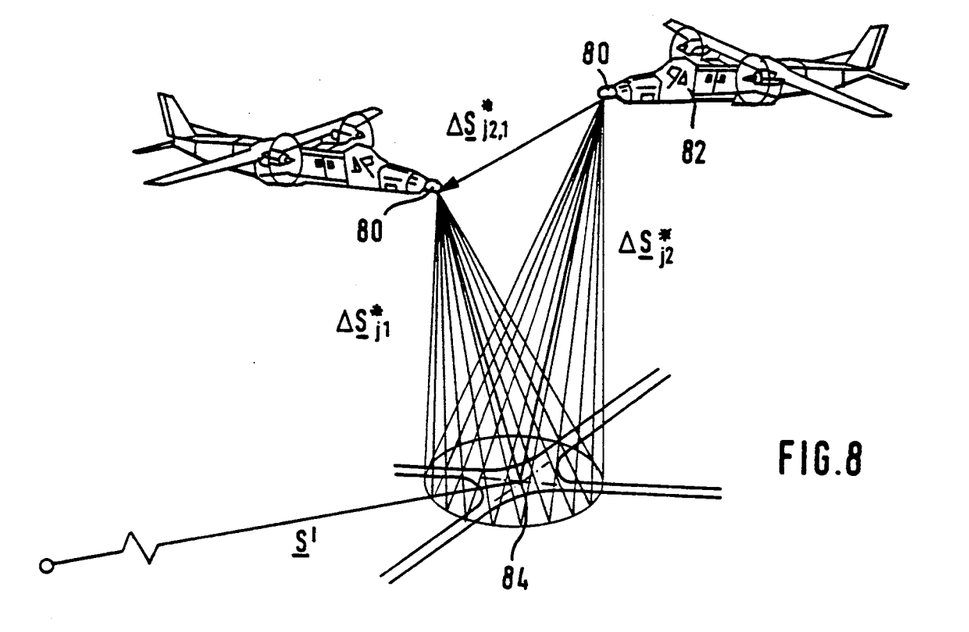
FIG. 8 shows the procedure in application for the measurement of trajectories and movements.

In the example of FIG. 8 a complete inertial system 80 is provided which can be installed on board of an aircraft 82. In this case the reference data are landmarks 84 along the contour to be measured and represented here as center point of a crossroads.

EXAMPLE NO. 4

Figure 9:
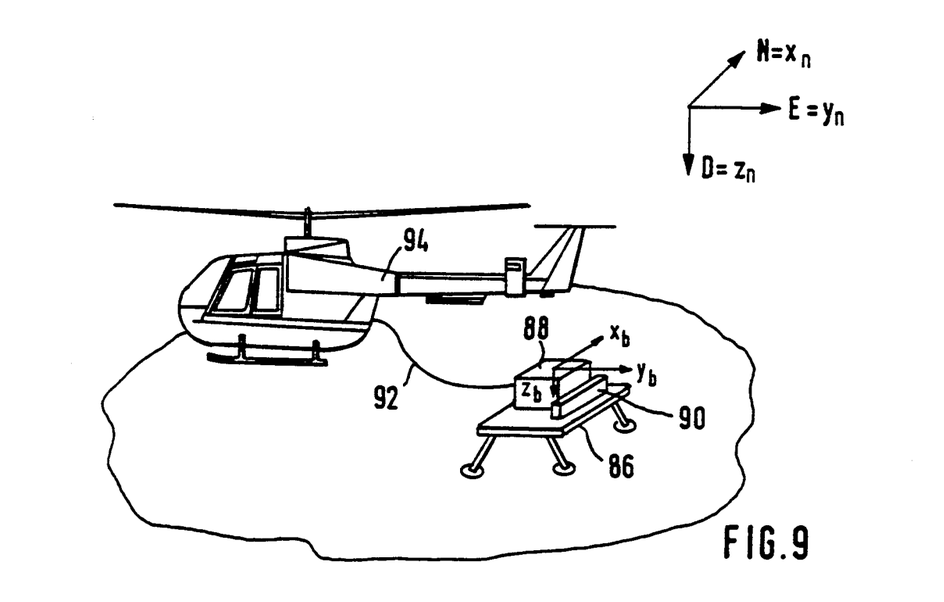
FIG. 9 shows the procedure in application for the measurement of trajectories and gravity anomalies.

Also for the measurement of gravity anomalies the measurement system consists of a complete INS with reference surfaces, a computer for the reading-in of the reference data and, in addition, as represented in FIG. 9, at least one stationarily fixed mounting tray 86 for the measurement instrument 88. The mounting tray is provided with reference surfaces 90, with the aid of which the measurement instrument can reproducibly be installed for the angular and positional measurements at the landmark. The measurement instrument 88 constantly remains linked to the data registration system installed on board of a transport vehicle, represented here as helicopter 94 via the connecting cable 92.

Common for all examples is the basic idea of the measuring procedure and the subsequent data processing, which means that under uniform exterior measurement conditions repetitiously and at discrete time intervals executed measurements of differences with regard to unknown, yet equal measurement conditions for the respective angles and/or velocities and/or positions are used for the calibration of the system deviation and for subsequent correction thereof in the computer.

The equality of the reference directions in time intervals can be established by simple constructive means—for example, as mentioned above, by reference surfaces (FIG. 1) or an appropriate angular guide rail (FIG. 2) of the measurement package. It is also possible to interconnect measurements such as optical angle measurements of the non-guided gyro measurement package with reference to the surface or trajectory to be surveyed, as you will find described below (FIG. 3).

When angular or positional characteristics are measured, the applied or resulting forces or moments are processed in the computer as reference data for the equality of the measuring conditions for the unknown angle and/or unknown positions (FIG. 4), as is explained in more detail in U.S. Ser. No. 07/699,481. This is permissible, since it is started from the assumption that there is a definite relationship between the reference data and the angles and/or positions for the measurement of the characteristics.

The equality of the measurement conditions relative to a position in time intervals is, for instance, obtained through back and forward movements on the same track (FIGS. 5 to 7), in connection with which it is theoretically possible to refer to an infinite number of points for the calibration of the system deviation through appropriate marking. The movement back can however also be implemented on a different track, yet it has then to be taken into account that the measurements have to be carried out with reference to the same earth-fixed locations as on the way there (in the following they will be called crosspoints) (see FIGS. 8 and 9). The equality of the crosspoints can then be supplied to the computer also in the form of numbers as reference data.

The measurement of angles and angular characteristics in a plane by means of a gyro plus computer is described in U.S. Ser. No. 07/699,481.

For spatial measurement the procedure has to be extended in the following points:

Integration of the 3 gyro measurements and compensation of earth rate for spatial directional computation adapted data processing for the calibration of the 3 gyros, and correction of the system.

In principle, the first point is transferable from any modern strapdown inertial system, and are, for instance, described in Gyroscopic Instruments and their Application to Flight Testing, AGARDograph No. 160, Vol. 15, September 1982, Chapter 7.4.4. For the integration of a transformation matrix $C_{nb}$ for the vector transformation of the body-fixed coordinate system ($x_b$, $y_b$, $z_b$) into the geographical or navigational coordinate system ($x_n$=N=north, $y_n$=E=east, $z_n$=D=down) gyro measurements are taken up. In this connection it has to be considered that, due to their physics, gyros measure the rotation $\omega^{ib}$ with reference to inertial space (Index i), and that the integration of their measurement signals leads to a corresponding transformation matrix $C_{ib}$ in accordance with the differential equation:

$$\dot{C}_{ib}{}^* = C_{ib}{}^* \cdot \Omega^{ib*} \tag{1}$$

with $$\Omega^{ib*} = \begin{pmatrix} 0 & -\omega_z & \omega_y \\ \omega_z & 0 & -\omega_x \\ \omega_y & \omega_x & 0 \end{pmatrix}^{ib*}, \tag{2}$$

the asterisk indicating that the integration contains errors as a result of measurement uncertainties of the sensors. The distinction of those measurement uncertainties from the correct measurements is subject of the invention and is treated below.

The transformation matrix $C_{nb}$ can, for instance, be obtained according to the following relationship:

$$C_{nb}{}^* = C_{ni}{}^* \cdot C_{ib}{}^* = C_{in}{}^{T*} \cdot C_{ib}{}^*, \tag{3}$$

$C_{in}{}^{T*}$ being obtained through integration of:

$$\dot{C}_{in}{}^* = C_{in}{}^* \cdot \Omega^{in*}. \tag{4}$$

As most angular measurements are locally limited to a definite area and influences of the earth curvature hence become negligible, the integration of $\dot{C}_{in}$ is solely based on the earth rate dependent on the geographical latitude $\phi$ $$\omega^{ie} = \omega^{ie} \cdot (\cos \phi\ 0\ -\sin \phi)^T, \tag{5}$$

whose components define the elements of the skew-symmetric matrix:

$$\Omega^{in*} = \Omega^{ie*} = \omega^{ie} \cdot \begin{pmatrix} 0 & \sin\phi & 0 \\ -\sin\phi & 0 & -\cos\phi \\ 0 & \cos\phi & 0 \end{pmatrix}. \tag{6}$$

It can be a assumed here that the earth rate is known with sufficient accuracy and that its integration is error-free and hence the asterisk can be omitted in Eqs. (4) to (6).

For the integration of Eqs. (1) and (4) the initial conditions have to be determined. This is fairly easy for Eq. (1), as the geographical longitude can be assumed to be zero in the beginning, and only the geographical latitude $\phi$ of the measurement point has to be fed in.

$$C_{in,0} = \begin{pmatrix} \cos\phi & 0 & \sin\phi \\ 0 & 1 & 0 \\ -\sin\phi & 0 & \cos\phi \end{pmatrix}. \tag{7}$$

For Eq. (1) this leads to:

$$C_{ib,0} = C_{in,0} \cdot C_{nb,0}. \tag{8}$$

$C_{nb,0}$ contains the initial alignment of the gyro measurement package with respect to north and the vertical. According to known procedures it is generally defined by means of external sensors (magnetic compass, north-seeking gyro and bubble-level), for instance in the form of the three Euler angles, i.e. roll, pitch and yaw angles, for setting the 9 elements of the unknown matrix $C_{nb,0}$ as described in the literature (German Aviation Standards LN 9300, Beuth Vertrieb GmbH Köln, 1970). The gyro measurements carried out in the following refer, of course, to the directions determined by $C_{nb,0}$. Errors in those reference directions as against the geographical coordinate system are not comprised in the described measurement procedure.

For the data evaluation the model of the error propagation in the measurement system has to be known. For that purpose the integrated transformation matrix $C_{ib}{}^*$ obtained through integration of the gyro measurements and the matrix $\Omega^{ib*}$ (see Eqs. (1) and (2)) are subdivided into:

$$C_{ib}{}^* = C_{i^*i} \cdot C_{ib}; \tag{9}$$

and $$\Omega_b{}^{ib*} = \Omega_b{}^{ib} + D. \tag{10}$$

$C_{i^*i}$ comprises the misalignment varying with time between the real and computed space-fixed reference systems which can also read $$C_{i^*i} = I + E^{i^*i} = I - E^{ii^*}, \tag{11}$$

with I being the unity matrix and $E^{ii*}$ a skew-symmetric matrix, the elements of which are constituted by the generally very small misalignment angles $\epsilon_x$, $\epsilon_y$ and $\epsilon_z$ between the two coordinate systems:

$$E^{ii*} = -E^{i*i} = \begin{pmatrix} 0 & -\epsilon_z & \epsilon_y \\ \epsilon_z & 0 & -\epsilon_x \\ -\epsilon_y & \epsilon_x & 0 \end{pmatrix}. \tag{12}$$

D is a skew-symmetric matrix comprising the gyro drifts in the directions of the 3 measurement axes $d_x$, $d_y$ and $d_z$:

$$D = \begin{pmatrix} 0 & -d_z & d_y \\ d_z & 0 & -d_x \\ -d_y & d_x & 0 \end{pmatrix}. \tag{13}$$

Aim of the following derivations is to show in an examplary manner how in this and the other cases it is possible to obtain an optimal estimate for the sensor errors—in this case D and its variations with time r—on the basis of system error differences (in the present case $\Delta\epsilon$-measurements).

For the matrix of the misalignment angles between the real and the computed body-fixed coordinate system, transformed into the body-fixed coordinate system $$E = C_{bi} \cdot E_i \cdot C_{ib} \tag{14}$$

the following vector differential equation can be obtained from Eqs. (1) and (9) to (11), and then extended by a time function for drift rates $$\dot{\epsilon}_b = -\Omega^{ib}\cdot\epsilon_b + d + w_d \quad (15)$$

$$\dot{d} = r + w_r$$

$$\dot{r} = 0 + w_r'$$

with 0=zero vector and d=drift vector.
The form of Eq. (15) is:

$$\dot{x} = F\cdot x + w \quad (16)$$

with $$x = (\epsilon^T d^T r^T)^T \quad (17)$$

and $$\epsilon = (\epsilon_x \epsilon_y \epsilon_z)^T \quad (18)$$

$$d = (d_x d_y d_z)^T$$

$$r = (r_x r_y r_z)^T$$

$$F = \begin{pmatrix} -\Omega^{ib} & I & 0 \\ 0 & 0 & I \\ 0 & 0 & 0 \end{pmatrix} \quad (19)$$

$$w = (w_d^T w_r^T w_r'^T)^T$$

$$w_d = (w_{dx} w_{dy} w_{dz})^T$$

$$w_r = (w_{rx} w_{ry} w_{rz})^T$$

$$w_r' = (w_{rx}' w_{ry}' w_{rz}')^T.$$

In Eq. (19) 0 is a 3×3 zero matrix and I the 3×3 unity matrix. The vector w contains a non-predictable stochastic element. The integration of w leads, for instance, to the system error known as random walk angular error.

The relationship between the system error varying at time tj and time 0 can be computed from the transition matrix $\Phi(t_j, 0)$ which again is derived from Eqs. (16) and (19) (Gyroscopic Instruments and their Application to Flight Testing, AGARDograph No. 160, Vol. 15, September 1982, Chapter 7.3). The index v indicates the computation forward in time:

$$x(t_j)_v = x_{j,v} = \Phi(t_j, 0)\cdot x(0) = \Phi(t_j, 0)\cdot x_0. \quad (21a)$$

As against this, a computation of $x_{j,r}$ backward in time from the final point T can also be carried out:

$$x(t_j)_r = x_{j,r} = \Phi(t_j, T)\cdot x(T) = \Phi(t_j, T)\cdot x_T. \quad (21b)$$

Since the gyro drifts d and their variations with time r can, in general, not be defined directly, but only by way of the integrated angular errors $\epsilon$, the model for the system error to be measured reads:

$$\epsilon_{j,v}^* = H\cdot x_{j,v} + v_j = H\cdot\Phi(t_j, 0)\cdot x_0 + v_j \quad (22a)$$

or $$\epsilon_{j,r}^* = H\cdot x_{j,r} + v_j = H\cdot\Phi(t_j, T)\cdot x_T + v_j, \quad (22b)$$

with $$H = (I\ 0\ 0) = \text{measuring matrix} \quad (23)$$

and $v_j$ the uncertainty in the angular measurement. At the present state of technology a multitude of angular measurements $\epsilon$ with reference to precise angular references has to be available for the estimate of the sensor errors d and r. For the calibration procedure mentioned at the beginning this is a necessary condition before and after the measurement itself or the aiding procedure. The measurement procedure on which the invention is based, does not have as prerequisite for the sensor calibration the angular measurement with respect to a known reference, but the measurement of the angular difference relative to a yet unknown, but equal measurement conditions at different individual time points $t_{j1}$ and $t_{j2}$. The measurement equations for the system error will then be:

$$y_{j,v} = H\cdot(\Phi(t_{j2}, 0) - \Phi(t_{j1}, 0))\cdot x_0 + v_j \quad (24a)$$

or $$y_{j,r} = H\cdot(\Phi(t_{j2}, T) - \Phi(t_{j1}, T))\cdot x_T + v_j. \quad (24b)$$

Both relationships are based on the same system error difference measurement, which reads as follows for Example No. 1:

$$y_{j,v} = y_{j,r} = y_j = \Delta\epsilon_{j2,1}^* = \epsilon_{j2}^* - \epsilon_{j1}^*. \quad (25)$$

Henceforward the Eqs. (24a,b) are called "model for the system error difference to be measured". For continuous angular measurement during one forward and backward movement of the gyro measurement package on the same path with angular guidance of the measuring package this evaluation procedure offers, in theory, unlimited evaluation possibilities through angular difference measurements between equal measuring conditions during the forward and backward movement.

The models for the system error difference to be measured form the basis for algorithms—regression or Kalman filtering—for the estimation of the sensor errors in the form of the state variables:

$$\hat{x}_0 = (\hat{\epsilon}_0\ \hat{d}_v\ \hat{r}_v)^T \quad (26a)$$

or $$\hat{x}_T = (\hat{\epsilon}_T\ \hat{d}_r\ \hat{r}_r)^T. \quad (26b)$$

The sensor errors are marked here by the indices v and r, as the data evaluation for the forward and backward movement generally leads to different results. By means of the two estimates the system error variation with time can be obtained off-line and at any point of time:

$$x_v'(t) = H\cdot\Phi(t, 0)\cdot\hat{x}_v, \quad (27a)$$

or $$x_r'(t) = H\cdot\Phi(t, T)\cdot\hat{x}_r. \quad (27b)$$

The optimal system error development is achieved on the basis of the weighed mean of the two functions. It serves as foundation for the subsequent correction of the measurements.

If the stochastic sensor errors $w_d$, $w_r$ and $w_i$ are extremely small, the real and the estimated sensor errors are, as experience shows, in accordance with high accuracy.

$$\hat{d}=d \text{ and } \hat{r}=r. \tag{28}$$

Otherwise $\hat{d}$ and $\hat{r}$ are an approximation of the true sensor error development. For the measurement process certain requirements have to be met, as described in U.S. Ser. No. 07/699,481. IF, for instance, the measurement uncertainty $\epsilon$ of the angular measurement in only one reference plane is given by:

$$\dot{\epsilon}=d+w_d \tag{29}$$
$$\dot{d}=r+w_r$$
$$\dot{r}=0+w_i$$

the one-dimensional transition matrix will read according to:

$$\Phi(t,0)=(1 \; t \; t^2/2) \tag{30}$$

and the model for the system error to be measured will read according to Eqs. (24a) and (25):

$$\Delta\epsilon_{j2,1}=[0 \; (t_{j2}-t_{j1}) \; (t_{j2}^2-t_{j1}^2)] \cdot (\epsilon_0 \; d \; r)^T + v_j. \tag{31}$$

In order to assure that the unknown coefficients d and r which are looked after, remain observable, the points of time $t_{j1}$ and $t_{j2}$ between the first and the second measurements at the respective points j of the measurements has to be selected in a way that the relationship $$(t_{j2}^2-t_{j1}^2)/(t_{j2}-t_{j1})=(t_{j2}+t_{j1}) \tag{32}$$

which is equal to twice the arithmetic mean between the measurement times in identical measurement positions, does not remain constant, but varies.

Figure 10:
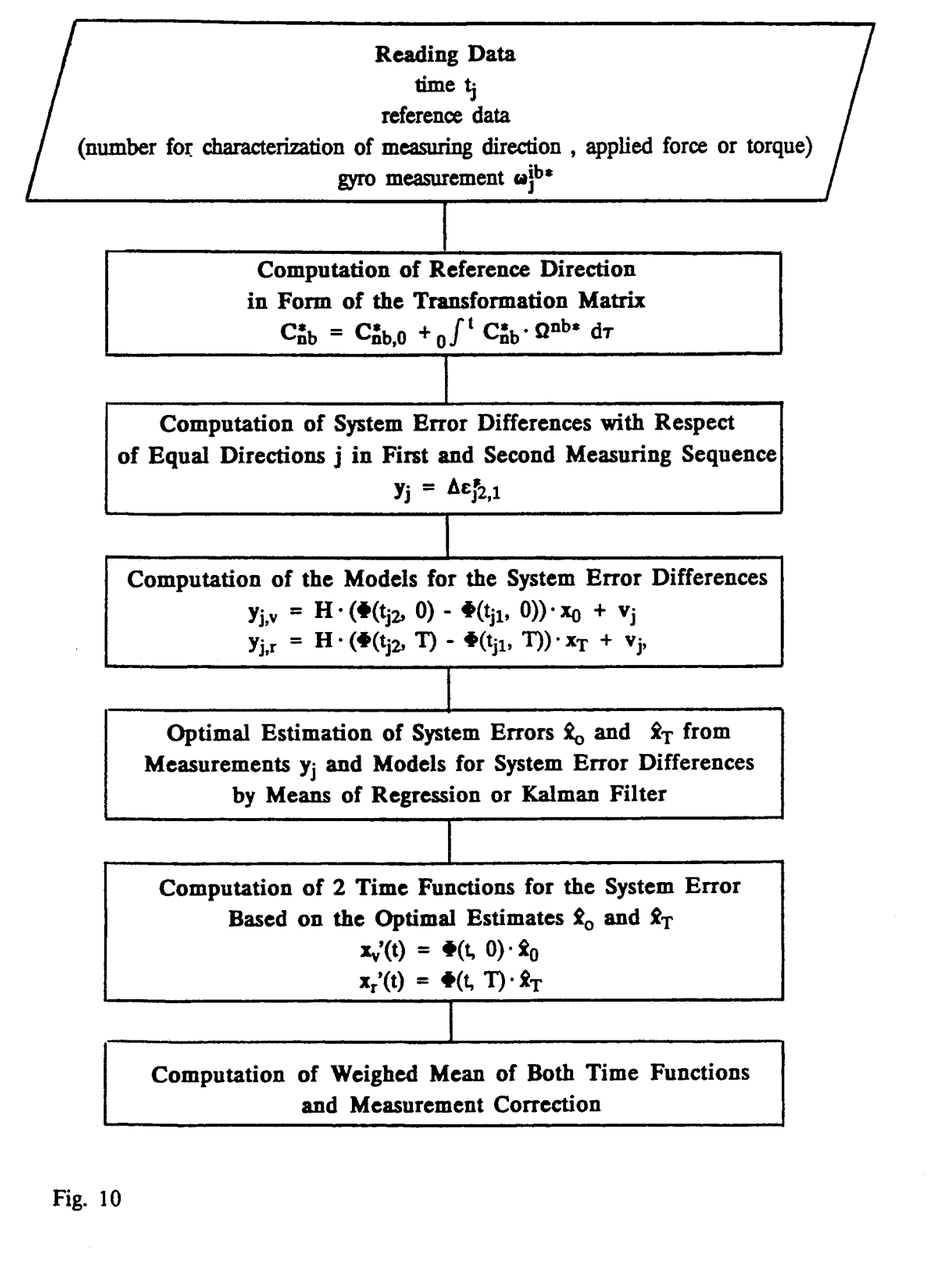
FIGS. 10 to 12 show the flow diagrams of the computer programs for various applications.

The procedure for the estimation of the uncertainties of the gyro measurement system with subsequent correction of the measurements is outlined as flow diagram for a computer program in FIG. 10.

So far it has been assumed that the gyro measurement package is in physical contact with the measurement surfaces. In many application cases the contact-free measurement of spatial angles is of particular interest. In those cases the required measurement of angles between measurement surface and gyro measurement package can expediently be carried out through optical procedures, as outlined in FIG. 3. Instead of measuring directly the angle wanted, measurements are carried out between the reference directions b and n, as well as b' and b, with b'=reference direction to be measured, and b=reference direction of the gyro measurement package. The transformation matrix will then read:

$$C_{nb'}{}^*=C_{nb}{}^* \cdot C_{bb'}{}^*, \tag{33}$$

$C_{bb'}{}^*$, being the transformation matrix to be computed from the optical measurement system. In this connection the asterisk indicates that the optical measurement generally also contains uncertainties. In this form the optical measurement instrument is comparable to the conventional autocollimator, yet without the customary geostationary basis.

In the described measurement and evaluation procedure it is started from the assumption that the gyro scalefactors are known with sufficient accuracy. Gyro manufacturers nowadays guarantee relative stability values of the order of magnitude of $10^{-3}$. If this value is not sufficient, the gyro measurement package has to be calibrated before use. This does not present any particular difficulties, since the scalefactor can fairly easily be defined by measuring a known angle. In field application the angle of 360° can be obtained by means of a plane surface with stops.

The scalefactor calibration procedure uses the above described angular measurement procedure. A mode identification is fed into the computer. For calibration the gyro is placed with its sensitive axis perpendicular to the surface and moved to the stop. As reference value the number 0 is fed in. The gyro is now rotated on the surface by an angle of 360° and again moved back to the stop, after which the number 1 is fed in. Measurements of additional positionings in the changing sense of rotation are marked with consecutive integers. Subsequently the measurement deviation varying with time is computed while taking into account that after a positive and a negative rotation of 360° the share of a constant scalefactor error is reduced to zero. The differences of measurements with even and odd numbers merely comprise the mentioned gyro measurement deviation $\epsilon(t)$. After estimation of its time function $\epsilon(t)$ and its correction the computer supplies the corrected angular measurements of the gyro which have to amount to ±360° after each rotation. From the difference the gyro's scalefactor can be computed and then eliminated through correction.

Measurement of Spatial Lines and Contours

A dead reckoning system for the continuous definition of the position of a vehicle consists of an odometer or speedometer, a directional reference and a computer for the definition of the vehicle's position in the geographical coordinate system (index n) from the measurement signals. For the spatial definition of lines and contours the velocity $V_b$ obtained under body-fixed conditions (index b), has to be transformed and integrated into the geographical coordinate system by means of the transformation matrix $C_{nb}$ in accordance with $$S_n=\int V_n dt = \int C_{nb} \cdot V_b dt \tag{34}$$

or, if odometers are used, incremented and transformed odometer readings are summed up in accordance with $$S_n=\Sigma C_{nb} \cdot \Delta S_b. \tag{35}$$

As against Example No. 1, for the spatial measurement of lines the 3- axis gyro package with guide rail only has to be supplemented by a sensor for the measurement of the velocity or of the path increment, for which there are three alternatives:

a) Reading-in of the preliminarily marked path during the measurement procedure (FIG. 5), b) measurement of the track by means of an odometer during the measurement procedure (FIG. 6), c) measurement of the linear acceleration of the measurement procedure and computation of the trackin the same was as in an inertial navigation system in strapdown technique.

Figure 11:
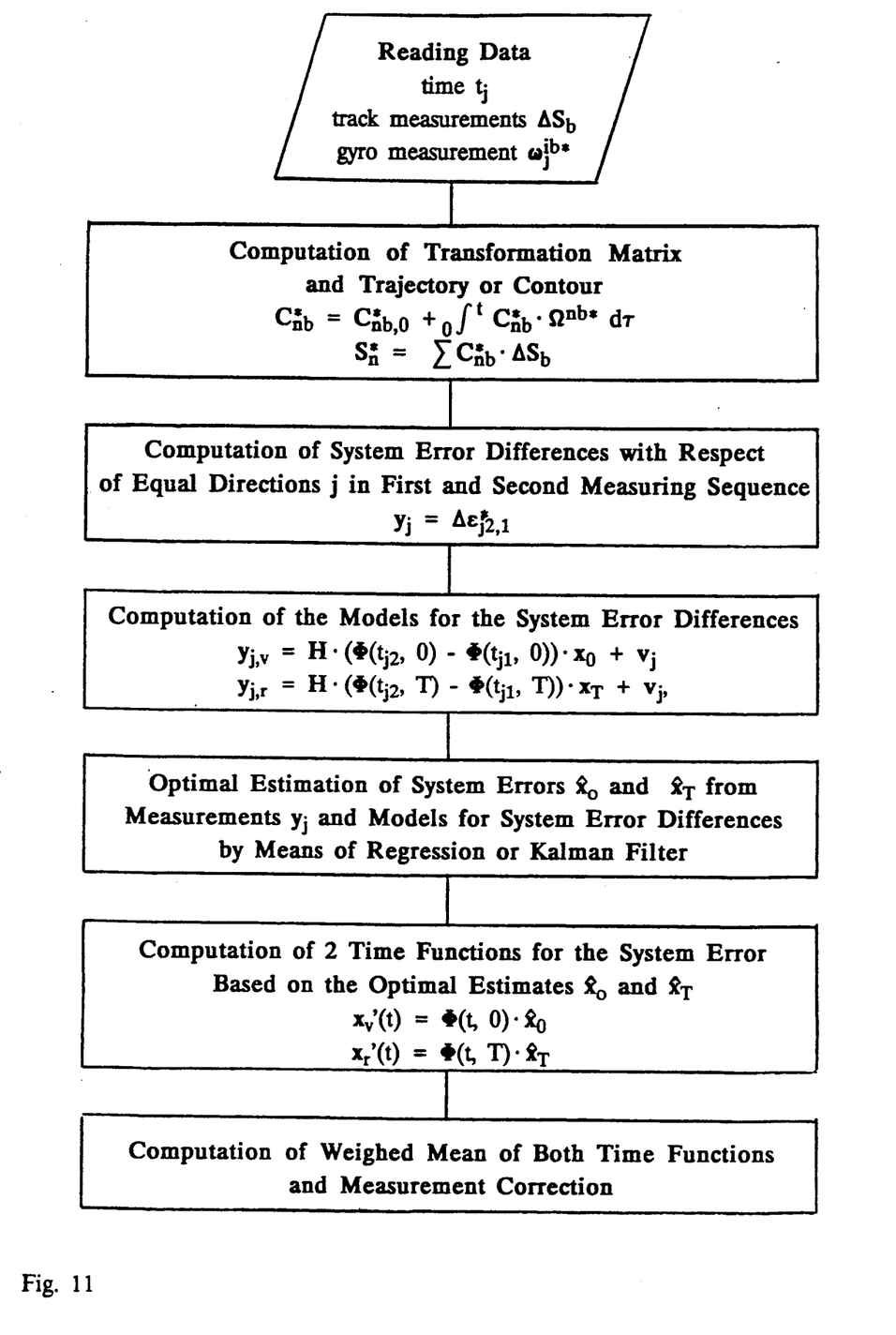

In Example No. 2 the preliminarily marked track is generally identified by the sticking-on of a digitally subdivided adhesive tape with fairly high resolution (FIG. 5). The definition of the measurement position—i.e. the spatial line or contour-is carried out through the forward and backward movements in application of Eq. (35) via the computer. As mentioned above, the same track is either run in the positive and negative directions, or, in the case of closed contours, two times in the same direction. The backward movement can however also take place on a different track with the crossing of the forward path. For the data evaluation the crosspoints and the initial and end points will then however only be available. FIG. 11 shows the flow diagram for the development of the data registration and evaluation of the described example.

In the example of FIG. 6 the gyro measurement package is equipped with an odometer similar to that of a motor vehicle (FIG. 6) and the incrementally measured track element $\Delta S_b$ is processed like in the preceding case.

The example with a complete inertial navigation system (INS) certainly offers the highest flexibility for the measurement of spatial lines, contours and trajectories.

Through addition of three more inertial sensors the system error behavior is influenced by additional error parameters—each accelerometer providing a scalefactor error, and a quasi-constant error (bias). Bias errors due to time cannot be distinguished from the effects of gyro drift, and therefore are also contained in the estimate. The scalefactor error due to the accelerometer measurement leads to track- dependent positional error on the system level, and cannot be included in the idea of the invention, yet the bias can. The influence of a possible scalefactor error has to be taken into account either at the beginning or end of the measurement series by calibration according to the known procedures, or, with that in mind, known positional reference points have to be used which are as far away as possible from the starting point.

In theory, the measurement uncertainty of such a system should be described as far as the angles (course, position), the velocity and also the position in the first approximation are concerned, by a coupled system of differential equations of first order in accordance with Eq. (15) with the state vector (Gyroscopic Instruments and their Application to Flight Testing):

$$x = (\epsilon^T \delta V_n^T \delta S_n^T d^T_r T_b^T)^T \tag{36}$$

in connection with which $\delta V_n$ = vector of the velocity error, $\delta S_n$ = vector of the position error, b = vector of the acceleration measurement error. The transition matrices $\Phi(t_j, 0)$, or $\Phi(t_j, T)$ as model for the system error difference to be measured (see Eq. (24)) thus can be computed for any point of time $t_{j1}$ and $t_{j2}$.

When using a complete inertial system for the measurement of spatial lines, contours and trajectories, the following measurement and evaluation procedures for the estimation of the system uncertainties in form of $\hat{x}$ are 1) position difference measurements and/or
2) velocity difference measurements and/or
3) angular difference measurements.

As against the present state of modern technology, the above described procedure for the measurement of velocity, i.e. the measurement of the absolute velocity zero as well as the velocity difference measurement with regard to any zero velocity measurements relative to other time points $t_j$ and $t_k$ can be evaluated for the aiding procedure of the system.

In theory, there is an indefinitely large number of positional difference measurements available for the forward and backward movement of the inertial system on the same track as well as for the registration of markings of the landscape overflown (FIG. 8), which will still be treated below in more detail.

Correspondingly measurements relative to crosspoints can be conceived, if the backward movement differs from the forward movement, if it crosses it or comes close to it, as has alredy been mentioned above. Combined measurements of position, velocity and angular difference can be carried out, if during the forward movement a mounting tray is installed at discrete points for the inertial system in view of obtaining the 3 parameters on the way back (FIG. 9). For a continuous positional and angular measurement a mechanical guidance of the inertial system is required along the measurement track (FIG. 2), or a corresponding contact-free measurement procedure (FIG. 7).

The data evaluationis is, in principle, identical with the above mentioned procedures, H defining $\delta S_n$ and/or $\delta V_n$ and/or $\epsilon$. The corresponding flow diagram is drawn in FIG. 12.

In practice, the contact-free measurement of contours is of particular interest. According to the present standard know-how photogrammetry is well established in this field. If the measuring camera is mounted to a gyro measurement package (FIG. 7) the underlying idea of the invention described above offers also in this field of measurement completely new possibilities, since this combination can be considered to be a photogrammetric theodolite, yet without the geostationary basis required at the present state of technology (periodical FORUM, issue No. 4/1987, Pages 193 to 213).

In the field of trajectory measurements, such as the measurement of a flight path, the combination of an INS with a measuring camera (FIG. 8) equally offers a very favorable possibility, since it allows in combination with the subject of the invention and the use of exclusively on-bord means an increase in accuracy through the employment of unknown external references. The data evaluation takes place in the following way. $S_j'$ being a defined land mark identical for the forward and backward movements (fligh paths), $\Delta S_{j1}^*$ and $\Delta S_{j2}^*$ being the generally different position measurements of the measuring camera on the forward and backward movements with reference to that point, $S_{j1}$ and $S_{j2}$ being the true flight path during the forward and backward movements, and $\delta S_{j1}$ and $\delta_{j2}$ being the corresponding INS position error, the measured INS position will read as follows for the two points of time:

$$S_{j1}^* = S_j' + \Delta S_{j1}^* + \delta S_{j1} \tag{37a}$$

and $$S_{j2}^* = S_j' + \Delta S_{j2}^* + \delta S_{j2} \tag{37b}$$

from which it can be concluded that in the positional error difference measurement the position of the land mark is cancelled and its coordinates therefore need not be known. The actual distances $\Delta S_{j1}^*$ and $\Delta S_{j2}^*$ between the land mark and the INS do not enter into this difference measurement either, but solely the relative optical measurement $\Delta S_{j2,1}^*$ between the forward and backward flights as outlined in FIG. 8. Thus for data evaluation a small number of land marks which can be traced over a more or less long period of time, can be used as well as the continuously registered landscape. Even for the optical registration of only one marking point on the forward and backward flights during an only short period of time a multitude of combination possibilities are offered for the positional error difference measurements. It is, of course, necessary that at least one external reference point (for instance take-off or landing point) has to be known for the data evaluation to which the actual flight path can be referred to. For the accuracy of the procedure a second reference point at the end of the flight will be useful.

Measurement of Motions

Rotation and translation describe the movements of bodies. Their measurement is generally done by means of a complete inertial navigation system (INS). In the high-frequency range the uncorrected output signals of an INS can as a general rule be used for the accurate measurement of motions, since the INS measurement uncertainty starts only to build up with increasing time, as has already been mentioned. It is then not required to obtain an improvement of the measurements through the introduction of the invented idea.

The idea of the invention becomes however useful if the motion of a body is supposed to be measured over a long period of time and with high accuracy in the form of synchronous measurement of its angular position and/or trajectory.

With the technical know-how available at present this is done by aiding the INS through position or velocity measurements-in flight testing through radar measurements, for instance.

For the measurement of motions the invention is insofar useful, as it allows a bord- autonomous INS calibration through a plurality of sequential angle, velocity and position measurements with reference to unknown, but earth-fixed marking points.

Figure 12:
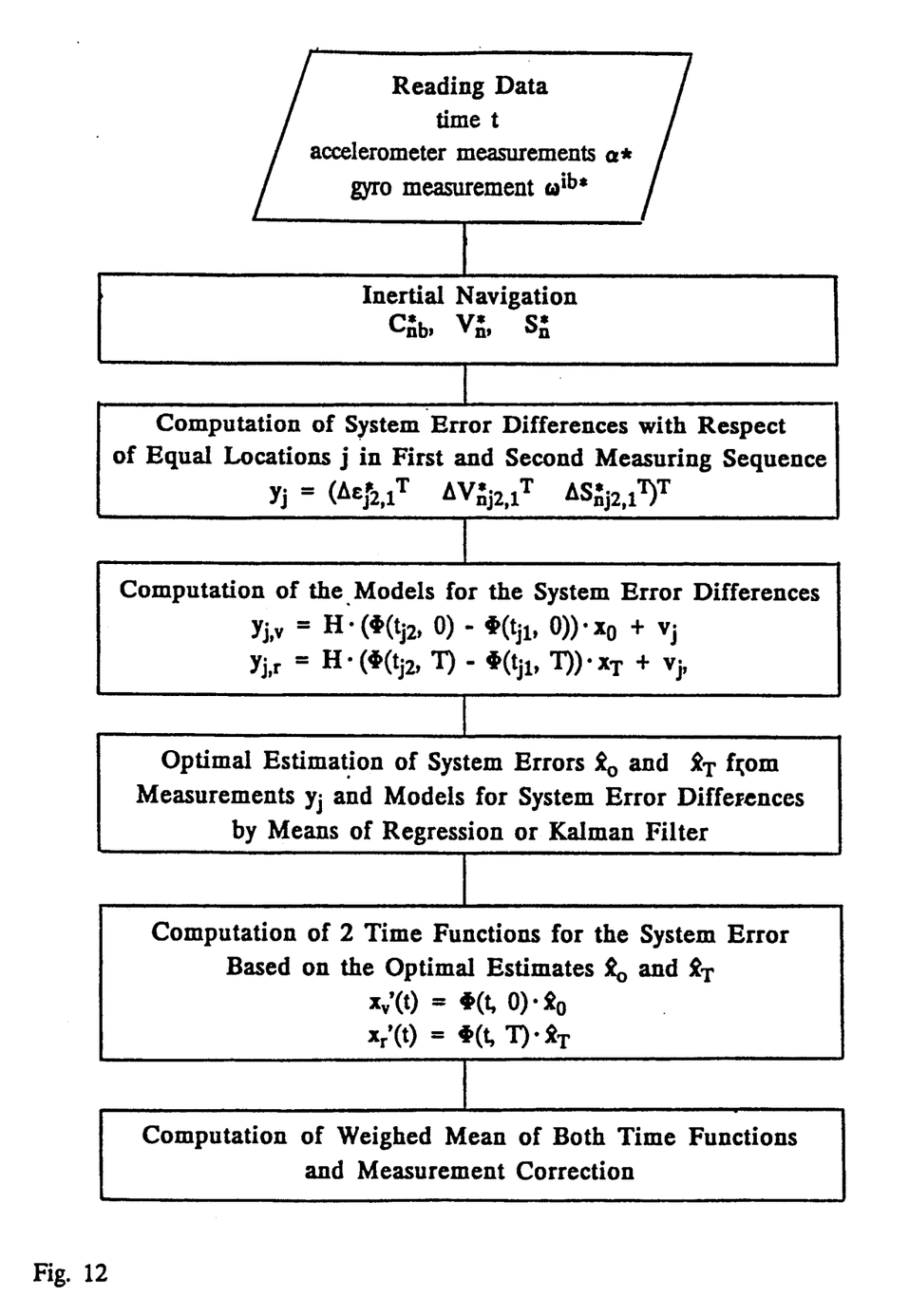

In this connection the calibration through positional difference measurements only turns out to be realistic. In flight or vehicle testing, for instance, one or several track markings or land marks are sequentially overflown or contacted and optically traced for photogrammetric evaluation. This can also be done in a quasi- continuous way, as described above. Thus the data evaluation is identical with the above described procedure for the measurement of trajectories and contours (FIG. 12).

Measurement of Gravity Anomalies

The measurement of gravity anomalies with respect to magnitude and direction is, with regard to a geostatic reference direction, a combination of high accuracy measurements of position and acceleration. According to modern know-how they are measured by means of
- special gravimeters in stationary operation or
- inertial systems in dynamic operation.

In the latter case the measured INS errors with respect to velocity and/or position indicate the gravity anomaly effective during a motion.

With the use of an INS the invention offers a more direct way for the measurement of gravity anomaly changes with regard to the value of the starting point. This can be seen from examples No. 2 and 3.

If mounting trays are used at the measurement points (FIG. 9), difference measurements become possible for position, velocity as well as angles for accurate INS calibration and definition of the gravity influence.

I claim:

1. A method for measuring spatial angles at at least two different measurement positions by means of an apparatus including three gyros comprising the steps of:
    moving said apparatus in a first predetermined order to each of said measurement positions in order to make measurements with respect to predetermined reference directions at said measurement positions, said gyros continuously outputting gyro signals;
    continuously registering said gyro signals;
    registering reference data at each of said measurement positions, said reference data having a predetermined relationship with said measurement positions at which said spatial angles are to be determined;
    registering a first time t at which said reference data are registered;
    moving said apparatus in a second predetermined order opposite to said first predetermined order and registering reference data and registering a second time t at which said reference data are registered for each of said measurement positions;
    calculating for each of two corresponding reference data, a difference of said first registered time t and said second registered time t at which the reference data are registered, and a difference of said registered gyro signals at which the reference data are registered, said registered time difference and said registered gyro signals difference being used as input for a measurement equation for optimally estimating a system error time function;
    optimally estimating said system error time function using said measurement equation; and
    correcting said registered gyro signals by means of said estimated system error time function, thereby producing measurements of said spatial angles at said measurement positions.

2. The method of claim 1, wherein said measurement equation includes first and second models for the development with time of the estimated system error time function,
    said first and second models including sensor errors,
    said first model being computed forward in time for a time 0 at the beginning of the measurement,
    said second model being computed backward in time for a time T at the end of the measurement,
    said first and second models being set equal to measurement differences $y_j$ in order to form a measurement equation comprising:

$$y_{j,v} = H \cdot (\Phi(t_{j2}, 0) - \Phi(t_{j1}, 0)) \cdot x_0 + v_j$$

$$y_{j,r} = H \cdot (\Phi(t_{j2}, T) - \Phi(t_{j1}, T)) \cdot x_T + v_j$$

wherein
j indicates a direction of measurement
1 indicates a first point in time
2 indicates a second point in time
v indicates calculation forward in time
r indicates calculation backward in time
H = (I 0 0) = measurement matrix
$\Phi(t, 0)$ = transition matrix of point of time 0 to T
$x = (\epsilon T \ d T \ r T)T$ = system error vector
$\epsilon$ = angle error vector
d = gyro drift vector
r = vector of time dependent gyro drift variation
v = measurement noise vector said angle error vector ε, said gyro drift vector d, said vector of time dependent gyro drift variation r, and said measurement noise vector v being taken for optimally estimating said system error vector x, wherein two time functions of the optimally estimated system error vectors, $x_v$ and $x_r$ are computed based on the beginning and the end of the measurements as a foundation for a joint time function $\hat{x}$ obtained through formation of a weighed means value computation, said correction of said registered gyro signals being carried out by means of said system error time function.

3. The method of claim 1 wherein repeated measurements with corresponding reference data are carried out so that the arithmetic mean $(t_{j2}+t_{j1})$ between the measurement times $t_{j2}$ and $t_{j1}$ at corresponding reference data positions does not remain constant, said repeated measurements with corresponding reference data being carried out for the purpose of observing a time dependent gyro error.

4. In the method of claim 1, said apparatus further including a carrier upon which said three gyros are mounted, and a track having a trajectory, said step of moving said apparatus comprising moving said carrier along said track to each of said measurement positions, said method further comprising the step of measuring the distance of each location with respect to a starting location, said distances being taken as reference data, said steps of moving said carrier along said track and measuring the distance of each location with respect to a starting location being operative for measuring a trajectory of said apparatus.

5. The method of claim 4 further comprising the step of measuring the relative direction between said track and said carrier at each measurement position.

6. In the method of claim 1, said apparatus further including a carrier having an inertial navigation system, and three accelerometers, said method further comprising the step of computing a system error vector using the equation comprising:

$$x = (_\epsilon T \, \delta V_n T \, \delta S_n T \, _d T \, _r T \, _b T)T$$

wherein
x = system error vector
ε = angle error vector
T = time at the end of a backward in time measurement
$\delta V_n$ = velocity error vector,
$\delta S_n$ = position error vector,
b = vector of the acceleration measurement error,
d = gyro drift vector, and
r = vector of time dependent gyro drift variation.

7. The method of claim 6, wherein said measurement equation includes first and second models for the development with time of the estimated system error time function, said first and second models including sensor errors, said first model being computed forward in time for a time 0 at a beginning of the measurement, said second model being computed backward in time for a time T at the end of the measurement, said first and second models being set equal to measurement differences $y_j$ to form a measurement equation comprising:

$$y_{j,v} = H \cdot (\Phi(t_{j2}, 0) - \Phi(t_{j1}, 0)) \cdot x_0 + v_j$$

$$y_{j,r} = H \cdot (\Phi(t_{j2}, T) - \Phi(t_{j1}, T)) \cdot x_T + v_j$$

wherein
j indicates a direction of measurement
1 indicates a first point in time
2 indicates a second point in time
$_v$ indicates calculation forward in time
$_r$ indicates calculation backward in time
H = (I 0 0) = measurement matrix
$\Phi(t, 0)$ = transition matrix of point of time 0 to T
$x = (_\epsilon T \, _d T \, _r T)T$ = system error vector
ε = angle error vector
d = gyro drift vector
r = vector of time dependent gyro drift variation
v = measurement noise vector said angle error vector ε, said gyro drift vector d, said vector of time dependent gyro drift variation r, and said measurement noise vector v being taken for optimally estimating said system error vector x, wherein two time functions of the optimally estimated system error vector, $x_v$ and $x_r$ are computed based on the beginning and the end of the measurements as a foundation for a joint time function $\hat{x}$ obtained through formation of a weighed means value computation, said correction of said registered gyro signals being carried out by means of said system error time function.

8. In the method of claim 6, said step of taking said position measurements further including the step of taking velocity measurements, said system error time function being calculated using the measurement matrix comprising:

$$H = (0 \, I \, I \, 0 \, 0 \, 0).$$

9. In the method of claim 6, said step of taking said position measurements further including the step of taking angular measurement with respect to identical reference directions, said system error time function being computed using the measurement matrix comprising:

$$H = (I \, 0 \, I \, 0 \, 0 \, 0).$$

* * * * *